United States Patent [19]

Ewanizky

[11] 3,863,105
[45] Jan. 28, 1975

[54] COAXIAL MARX-BANK DRIVER CIRCUIT FOR PULSE LASERS

[75] Inventor: Theodore F. Ewanizky, Manasquan Park, N.J.

[73] Assignee: The United States of America, as represented by the Secretary of the Army, Washington, D.C.

[22] Filed: Mar. 1, 1974

[21] Appl. No.: 447,431

[52] U.S. Cl............. 315/245, 307/110, 315/36, 315/205, 315/227 R, 317/242, 317/261
[51] Int. Cl............. H02m 3/18, H05b 41/26
[58] Field of Search......... 315/36, 191, 200 R, 205, 315/227 R, 245; 307/110; 320/1; 317/242, 256, 261

[56] References Cited
UNITED STATES PATENTS

| | | | |
|---|---|---|---|
| 2,014,219 | 9/1935 | Allibone | 307/110 X |
| 3,461,363 | 8/1969 | Blank | 317/261 |
| 3,505,533 | 4/1970 | Bernstein et al. | 307/110 |
| 3,694,709 | 9/1972 | Kind et al. | 317/261 X |

*Primary Examiner*—Rudolph V. Rolinec
*Assistant Examiner*—E. R. La Roche
*Attorney, Agent, or Firm*—Daniel D. Sharp; Robert P. Gibson; Nathan Edelberg

[57] ABSTRACT

A flashlamp pumped laser system having a laser medium requiring optical pumping pulses of short duration, fast risetime, and high peak power which uniquely incorporates a low inductance, coaxially configured Marx-Bank circuit (a multi-stage circuit, each stage having a spark gap and a storage capacitor, with the capacitors being charged in parallel and discharged in series through the spark gaps) characterized by relatively small and inexpensive components and lower dc voltage ratings than those normally in use, whereby pulses of short duration, and high voltage and high input energy can be obtained for driving the flashlamp and whereby problems of insulation and high dc voltage breakdown can be minimized.

10 Claims, 3 Drawing Figures

PATENTED JAN 28 1975 3,863,105

COAXIAL MARX-BANK DRIVER CIRCUIT FOR PULSE LASERS

BACKGROUND AND SUMMARY OF THE INVENTION

This invention relates to a compact, low-inductance, multi-stage driver circuit of coaxial construction and including storage capacitors charged in parallel from a high voltage dc power supply and discharged in series connection to supply multiplied ac voltage to a load. The driven circuit package includes a plurality of hollow cylindrical capacitors having annular electrodes at opposite ends thereof, said capacitors being mounted coaxially within and closely spaced from a metal cylinder which serves as one circuit bus. Flat spark gaps are also disposed between juxtaposed ends of the capacitors, while a flat triggered spark gap also is positioned adjacent one end of one of the capacitors. The coaxial driver circuit can be used in conjunction with a coaxial, low inductance laser flashlamp.

Certain pulsed lasers, such as organic dye lasers, typically have high power thresholds, and, for maxium efficiency, require an optical excitation source (pump) capable of producing short duration, fast risetime optical pulses of very high power. This requirement, of course, can be satisfied only if the pump drive circuit can deliver ac pulses of high peak power to the laser excitation source.

Previous schemes for flashlamp pumping of dye lasers have consisted basically of a single-stage capacitor for driving the flashlamp, which capacitor is charged from a dc power supply in the tens of kilovolts range. Such a design, although capable of exciting such lasers as organic dye lasers at moderate (about 100 joules) input energies, present severe problems if somewhat higher input energies are desired since the small values of capacitance generally used to produce microsecond-duration pump pulses require application of relatively high dc charging voltages.

If one increases the capacitance in order to increase the energy ($E = \frac{1}{2}CV^2$), the pulse duration and risetime increase correspondingly. Therefore, an increase in energy accomplished in this manner does not provide the desired increase in pulse peak power. Moreover, an increase in capacitance results in an increase in inductance; such an increase of inductance, of course, adversely affects the pulse duration and risetime.

If one increases the dc charging voltage to achieve higher energy, larger and more expensive components with higher dc voltage ratings are required, and the high voltage leakage problem becomes more severe. This problem is particularly severe in the case of compact component placement needed to reduce lead inductance.

A driver circuit known as the Marx-Bank circuit has been used previously for many purposes. The basic feature of this circuit is that a number of storage capacitors can be charged in parallel at a moderate dc voltage level, but discharged in series connection. Such a circuit would be advantageous for pumping the laser already described, since high applied voltages and flashlamp input energies may be attained with relatively low dc charging voltages.

The Marx-Bank circuit has two or more stages, each including a charging resistor, a storage capacitor and a load resistor; the first stage includes a triggered spark gap and each of the remaining stages, except for the last stage, is coupled to the succeeding stage by way of any inter-stage spark gap. The output from the last stage is applied to the load. Initially, the storage capacitors of the various stages are charged in parallel from a dc voltage power supply and the spark gaps are open. When the first spark gap is triggered, a current flow in the output load resistor of the first stage causes a negative voltage to appear at the ground terminal of the first inter-stage spark gap sufficient to break down that spark gap. The resulting current flow produces an increased voltage difference between the electrodes of the next spark gap sufficient to break down that spark gap. This process continues until all spark gaps are conducting, whereupon the storage capacitors are effectively in series with the load (laser flashlamp) so that a voltage appears across the load which is greater than that of the initial dc charging voltage.

The lead inductance inherent in the Marx-Bank circuit of the prior art is sufficiently large, however, to preclude attainment of pulses of short pulse duration.

In accordance with the invention, the inductance of the Marx-Bank drive circuit is greatly reduced by means of a unique coaxial package. The package includes axially aligned hollow cylindrical capacitors which inherently are of relatively low inductance. These hollow cylindrical capacitors are installed in a closefitting, thin-walled metal cylinder which can be lined with a thin layer of electrically insulating material, such as mylar. The metal cylinder serves as one of the supply buses for the Marx-Bank circuit, thereby avoiding the need for separate leads. The hollow cylindrical capacitors, which have electrodes at opposite ends thereof, not only have inherently low inductance, but are of such external configuration as to lend themselves to an in-line arrangement, whereby the current sheath in each capacitor lies close to, and parallel with, the current flowing along the metal cylinder. The direction of current flow in the metal cylinder is opposite to that of the net current flow along the cylindrical capacitor plates. Consequently, the net magnetic field in the region occupied by the hollow cylindrical capacitor plates and the conducting metal cylinder is substantially negligible and the self inductance of the circuit is minimized.

The use of hollow cylindrical capacitors also provides handy means for receiving leads which connect to resistors external to the coaxial drive circuit package.

The circuit package also includes pancake-shaped spark gaps which are flat spark gaps having electrodes at opposite ends and which can be installed close to the electroded ends of the hollow cylindrical capacitors. Each spark gap electrode can be coupled to a capacitor electrode by a more or less conical member inter connecting the annular electrode of the spark gap and the adjacent annular electrode of the capacitor associated therewith. Such spark gaps are well adapted for use with the coaxial configuration already referred to, and, being short, do not add materially to the inductance of the coaxial package.

SPECIFIC DESCRIPTION OF THE INVENTION

Figure 3:
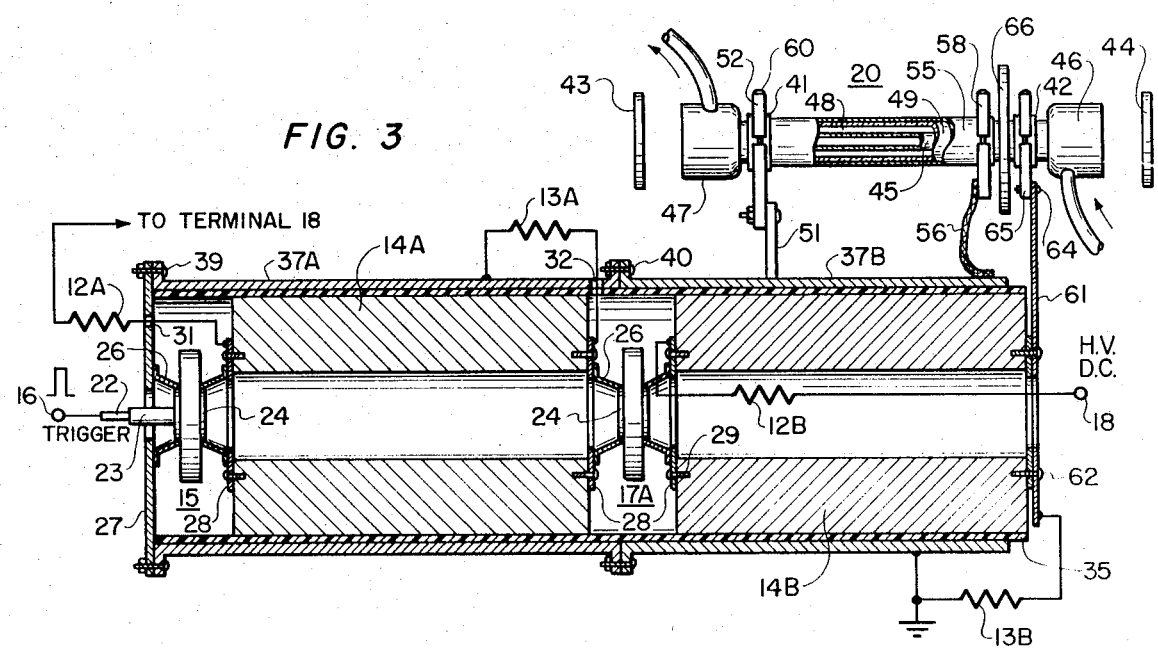
FIG. 3 is a view, largely in cross-section, of a coaxial arrangement for the circuit of FIG. 1, showing application to a dye laser.
Figure 1:
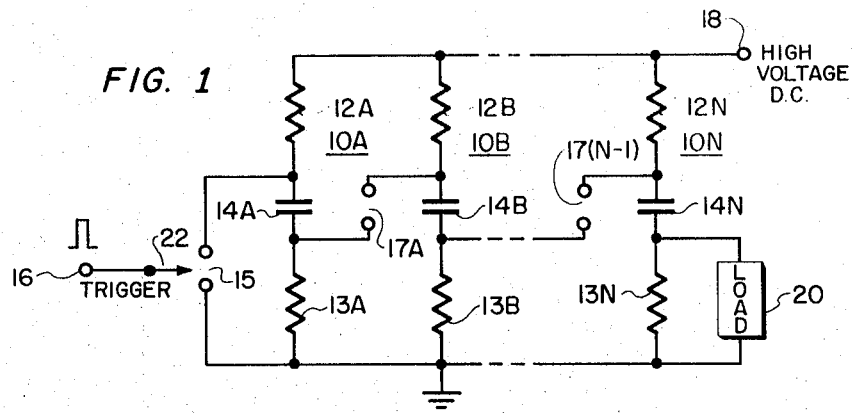
FIG. 1 is a schematic circuit of a typical Marx-Bank driver circuit useful for driving a pulse laser.

Referring to FIG. 1, a typical Marx-Bank type drive circuit is shown. As indicated by the dashed lines in the circuit diagram of FIG. 1, this circuit may comprise any number of stages 10A, 10B, . . . 10N. Each of these stages includes corresponding charging resistors 12A, 12B . . . 12N, output (load) resistors 13A, 13B . . . 13N and capacitors 14A, 14B . . . 14N. The initial stage (10A) includes a triggered spark gap 15 which can be energized by initial stage (10A) includes a triggered spark gap 15 which can be energized by a trigger voltage pulse applied to input terminal 16. Inter-stage spark gaps 17A to 17(N-1) are connected between each pair of adjoining stages. The charging resistors 12 are all connected to the high voltage terminal 18 of a suitable source of high direct current voltage; the other terminal of this direct current source is connected to ground, or any other negative reference terminal. A suitable load 20 is connected across the load resistor 13N in the final stage of the driver circuit. The triggered spark gap 15 has a central trigger electrode 22 which extends into the interior of the spark gap 15 through an insulator 23. Referring to FIG. 3, as well as to FIG. 1, a charging current from the high voltage dc supply charges capacitors 14A, 14B . . . 14N of FIG. 3 in parallel through charging resistors 12A . . . 12N. The voltage across spark gap 17A initially is $V - O = V$, where $V$ is the voltage at the high voltage dc supply terminal 18. When a trigger pulse is applied by way of terminal 16 to the trigger electrode 22 of initial spark gap 15, the latter breaks down rapidly and capacitor 14A discharges through the ionized spark gap 15 and resistor 13A. The voltage at the terminal of capacitor 14A connected to spark gap 17A becomes increasingly negative (from O to $-V$) relative to the positive voltage V at the upper terminal of spark gap 17A. This voltage difference 2V is sufficient to break down spark gap 17A. Capacitor 14B next discharges through spark gap 17A and resistor 13B; the voltage across spark gap 17 (N-1) then is sufficient to break down the latter, causing an ac current flow through load resistor 13N. The voltage pulse appearing across load resistor 13N, when applied to electrodes 41 and 42 of the laser flashlamp of FIG. 3, (20) is sufficient to pump the laser into the lasing condition.

Figure 2:
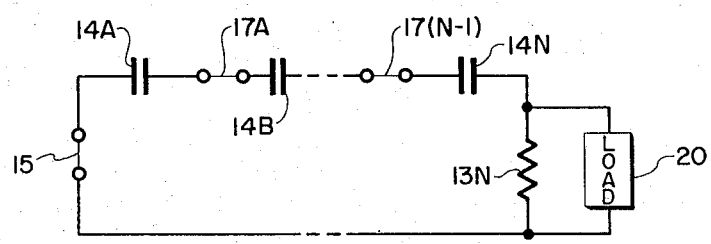
FIG. 2 is a simplified circuit diagram illustrating the ac discharge current path in the circuit FIG. 1.

The actual ac current path during discharge is shown in FIG. 2, where it will be noted that the capacitors 17 are effectively connected in series.

The triggered spark gap 15, as well as the remaining spark gap(s) 17, include electrodes 24 at opposite ends thereof. In the case of the triggered spark gap 15, one of the electrodes 24 is connected by means of a lead 26 to apertured metal plate 27, while the other electrode 24 of triggered spark gap 15, and the electrode 24 of all remaining capacitor(s) 17, are connected by similar leads 26 to capacitor electrodes 28. The capacitor electrodes 28 are annular electrodes disposed at opposite ends of the respective hollow cylindrical capacitors 14; these electrodes 28 can be mounted at the ends of the capacitors 17 by means of angularly disposed screws 29. The annular capacitor electrodes 28 and the conical leads 26 provide the most efficient distribution of contact area, although the other electrode and lead configurations can be chosen. One end of charging resistor 12A is connected to high voltage dc terminal 18 and the other end is connected to one of the electrodes 28 of the initial capacitor 14A by means of a lead extending through an insulator 31 in plate 27. The resistor 13A can be brought into contact with the other electrode 28 of capacitor 14A through an insulating bushing 32. The charging resistor 12B is connected between one of the electrodes 28 of capacitor 14B and high voltage terminal 18; this connection can be made by example, by means of a lead passing through the hollow cylindrical capacitor 14B. The hollow cylindrical capacitors 14A and 14B are surrounded by a thin cylindrical layer 35 of a material, such as mylar, which has high insulating quality. This layer 35 extends the entire length of the capicitors, including the region between adjacent capacitors, as indicated in FIG. 3. The layer 35 acts as a convenient means of insulating the capacitors from ground. Hollow cylindrical metal sheaths 37A and 37B surround the layer 35 and can be in actual contact therewith. Sheath 37A is connected to plate 27 by fastening devices 39 passing through a flange at one end thereof and is connected to sheath 37A by means of fastening devices 40 passing through flanges at adjacent ends of the sheaths 37A and 37B.

The laser 20 of FIG. 3, which includes the usual cavity-defining mirrors 43 and 44, further includes an inner tube 45 through which a liquid dye is circulated by means not shown in FIG. 3. This liquid dye enters the inlet header 46, passes through tubes 45 and exits by way of exit header 47. The space 48 between the inner laser tube 45 and outer envelope 49 is filled with a gas, such as xenon. The laser 20 is supported from the coaxial driver device by means including member 51 attached, as by brazing, to sheath 37B and secured to a split collar 52 of electrically insulating material. The split collar 52, as well as split collars 58 and 65, to be described later, are clamped firmly around the foil-clad tube 49, 55 by screws 60. Collar 52 engages ring electrode 41 which is sealed into one end of the laser envelope 49. A metal layer 55, such as aluminum foil, is wrapped abbout a major portion of the laser envelope 49 and is clamped thereto by the surrounding split collar 52. The self inductance of the laser flashlamp 20 is minimized by having current flow through the foil 55 along the length of tube 45. The flexible metal ribbon 56 secured to the sheath 37B and to a portion of the split metal collar 58 clamped about the foil-clad envelope 49, 55, serves to connect electrode 41 to ground. An apertured metal strap 61 is mounted by means of screws 62 at the free end of the Nth capacitor (capacitor 14B in FIG. 3) in electrical contact with the electrode 28 of capacitor 14B. The positive end of load resistor 13B is connected to this strap. The metal strap 61 is connected to the ring electrode 42 of the dye laser 20 by screws 64 to a split metal collar 65 clamped about the ring 42. The flow of current is from positive high voltage dc supply terminal 18, the more positive ring electrode 42, along the foil 55 to the left-hand ring electrode 41, through the gas-filled region 48 between the laser tube 45 and the envelope 49 to the right-hand ring electrode 42, and by way of the flexible ribbon 56 and sheath 37B to ground. Because of the proximity of the paths of oppositely directed current flow, namely the gaseous medium and the foil 55, the self-inductance of the laser device 20 is minimized. Since the split collars 58 and 65 are relatively close together, an electrically insulating spacer disc 66 is positioned around the envelope 49 between split collars 58 and 65 to prevent possible high voltage arc-over.

What is claimed is:

1. In a laser pump driver circuit having a plurality of circuit stages each having a high voltage dc charging circuit including a resistor and capacitor for charging said capacitor from a high voltage dc supply, each said circuit stage further including a spark gap and a discharging resistor through which the corresponding capacitor is discharged during activation of said spark gap for deriving an ac voltage, the final discharging resistor constituting a load resistor across which a laser pump can be connected, said capacitors being charged in parallel and connected in series by way of said activated spark gaps in reponse to triggering of an initial spark gap; the improvement comprising an elongated hollow cylindrical electrically conductive sheath surrounding and closely spaced from said capacitors, said capacitors being arranged coaxial with said sheath and being of hollow cylindrical configuration.

2. The laser pump driver circuit according to claim 1 wherein said capacitors are provided with annular electrodes at opposite ends thereof, said spark gaps being of discoidal configuration and interposed between juxtaposed ends of adjacent capacitors, said spark gaps having an electrode of each of the two opposed end faces thereof which is connected to an adjacent annular capacitor electrode.

3. The laser pump driver circuit according to claim 1 wherein said sheath serves as one bus for connecting said stages to the high voltage supply.

4. The laser pump driver circuit according to claim 2 wherein said sheath serves as one bus for connecting said stages to the high voltage supply.

5. The laser pump driver circuit according to claim 2 wherein said discharging resistor is connected between a corresponding annular capacitor electrode and said sheath by way of a small aperture in said sheath.

6. The laser pump driver circuit according to claim 2 further including an electrically conductive plate electrode apertured to permit passage of circuit leads and connected electrically to the annular capacitor electrode of the final one of said capacitors.

7. The laser pump driver circuit according to claim 1 wherein said driver circuit is a Marx-Bank circuit.

8. The driver circuit according to claim 1 further including a coaxial laser flashlamp electrically connected by a first short lead to the capacitor of the last circuit stage and by a second short lead to a portion of said sheath which is adjacent the region of connection of said first lead to said capacitor.

9. The driver circuit according to claim 2 further including a coaxial laser flashlamp electrically connected by a first short lead to an annular electrode of the capacitor of the last circuit stage and by a second short lead to a portion of said sheath adjacent said annular capacitor electrode.

10. The driver circuit according to claim 8 further including a tubular laser having an electrode at each end thereof, said laser envelope being closely spaced from and coaxial with said flashlamp, said flashlamp being surrounded by a thin electrically conductive member coextensive with said flashlamp and laser, said thin member being connected adjacent one end thereof to one of said laser electrodes and connected adjacent the other end thereof to said first lead, the other of said laser electrodes being connected adjacent said other end of said member to said second lead.

* * * * *